(12) United States Patent
de Bruijn et al.

(10) Patent No.: US 11,376,637 B2
(45) Date of Patent: Jul. 5, 2022

(54) SORTING DEVICE AND METHOD (71) Applicant: Optimus Sorter Holding B.V., Beuningen (NL)

(72) Inventors: Jacobus Johannes Adrianus de Bruijn, Beuningen (NL); Willem Dagobert Stronkhorst, Beuningen (NL)

(73) Assignee: Optimus Sorter Holding B.V., Beuningen (NL)

( * ) Notice: Subject to any disclaimer, the term of this patent is extended or adjusted under 35 U.S.C. 154(b) by 601 days.

(21) Appl. No.: 16/347,135

(22) PCT Filed: Nov. 8, 2017

(86) PCT No.: PCT/NL2017/050724
§ 371 (c)(1),
(2) Date: May 2, 2019

(87) PCT Pub. No.: WO2018/088899
PCT Pub. Date: May 17, 2018

(65) Prior Publication Data
US 2020/0055094 A1   Feb. 20, 2020

(30) Foreign Application Priority Data

Nov. 8, 2016  (NL) ...................... 2017747

(51) Int. Cl.
*B07C 5/36* (2006.01)
*B07C 5/34* (2006.01)
(Continued)

(52) U.S. Cl.
CPC .............. *B07C 5/36* (2013.01); *B07C 5/3412* (2013.01); *B65G 47/244* (2013.01); *B65G 47/96* (2013.01);
(Continued)

(58) Field of Classification Search
CPC .......... B07C 5/36; B07C 5/3412; B07C 5/362; B07C 3/082; B07C 3/08; B65G 47/244;
(Continued)

(56) References Cited

U.S. PATENT DOCUMENTS 1,404,591 A   1/1922  Fredrickson
3,454,614 A   7/1969  Tani et al.
(Continued)

FOREIGN PATENT DOCUMENTS

EP   1972579 A1   9/2008
NL   2013604 B1   10/2016
(Continued)

*Primary Examiner* — Gene O Crawford
*Assistant Examiner* — Muhammad Awais
(74) *Attorney, Agent, or Firm* — Shewchuk IP Services, LLC; Jeffrey D. Shewchuk (57) ABSTRACT

A sorting device (1) for loading, conveying and discharging objects (9), the sorting device (1) comprising:
  trays (2) each intended for carrying an object (9) in a conveyance direction (T) from a loading position (L) to a discharge position (D),
  a drive system (6) for conveying the trays (2) along a path (26),
  a pusher arm (5) arranged on the tray (2) for by means of pushing away, discharging an object (9) present on the tray (2), wherein pushing away takes place substantially transverse to the conveyance direction (T) of the tray (2),
  a scanning device (3) arranged along the path (26) at a scanning position (30) downstream the loading position (L), and arranged for scanning the object (9) during conveyance at the scanning position (30),
  a labelling device (4) arranged along the path (26) at a labelling position (40) downstream the scanning position (30), and arranged to compose a label based on the object (9) scanned by the scanning device (3), and to
(Continued)

affix the label during conveyance on the object (9) based on the scanned object (9) present on the tray (2).

15 Claims, 5 Drawing Sheets

(51) Int. Cl.
*B65G 47/244* (2006.01)
*B65G 47/96* (2006.01)
(52) U.S. Cl.
CPC ............... *B65G 2203/0225* (2013.01); *B65G 2203/044* (2013.01)
(58) Field of Classification Search
CPC ............ B65G 47/96; B65G 2203/0225; B65G 2203/044; B65G 2203/04; B65G 2203/041; B65G 2203/0216; B65G 2203/0233; B65C 9/46
USPC ......................................................... 209/552
See application file for complete search history.

(56) References Cited

U.S. PATENT DOCUMENTS

| | | |
|---|---|---|
| 3,918,587 A | 11/1975 | Drew, Jr. |
| 4,187,945 A | 2/1980 | Altenpohl et al. |
| 5,940,305 A * | 8/1999 | Wurz ................... B65G 1/1376 |
| | | 156/367 |
| 9,227,323 B1 * | 1/2016 | Konolige ............... B25J 9/1697 |
| 9,242,806 B2 * | 1/2016 | Hopman ............... B65G 47/844 |
| 9,446,908 B2 * | 9/2016 | Danelski ................ B65G 43/08 |
| 2005/0119786 A1 * | 6/2005 | Kadaba ............ G07B 17/00467 |
| | | 700/224 |
| 2013/0299396 A1 * | 11/2013 | Li ........................... B07C 7/005 |
| | | 209/552 |
| 2015/0144536 A1 * | 5/2015 | Dugat ....................... B07C 5/36 |
| | | 209/552 |
| 2015/0158186 A1 * | 6/2015 | Chuo ..................... B25J 9/044 |
| | | 74/490.03 |
| 2015/0217334 A1 * | 8/2015 | Kim ......................... B07C 3/08 |
| | | 209/552 |
| 2017/0073172 A1 | 3/2017 | Kuijpers et al. |
| 2017/0305674 A1 | 10/2017 | de Bruijn |

FOREIGN PATENT DOCUMENTS

| | | | |
|---|---|---|---|
| WO | 97/11790 A1 | 4/1997 | |
| WO | WO-9711790 A1 * | 4/1997 | ............. B07C 3/00 |
| WO | 03/098533 A1 | 11/2003 | |
| WO | WO-03098533 A1 * | 11/2003 | ............. B07C 3/10 |
| WO | 2013/116652 A1 | 8/2013 | |
| WO | WO-2013116652 A1 * | 8/2013 | ............. B07C 3/12 |
| WO | WO-2016067163 A1 * | 5/2016 | ............. B07C 1/06 |
| WO | 2016/133398 A1 | 8/2016 | |
| WO | WO-2016133398 A1 * | 8/2016 | ............. B07C 5/18 |

* cited by examiner

SORTING DEVICE AND METHOD

FIELD OF THE INVENTION

The invention relates to a sorting device for loading, conveying and discharging objects, and a method for conveying objects.

BACKGROUND OF THE INVENTION

Sorting devices for loading, conveying and discharging objects are well known in the art, such as a sorting device comprising:
- trays each intended for carrying an object in a conveyance direction from a loading position to a discharge position,
- a drive system for conveying the trays along a path,
- a pusher arm arranged on the tray for by means of pushing away, discharging an object present on the tray, wherein pushing away takes place substantially transverse to the conveyance direction of the tray.

Recently these kind of sorting devices became very popular in supply systems, for example for supplying shops in the field of retail, and in logistic and distribution systems wherein parcels need to be sorted. Also since e-commerce expanded enormously, a lot of articles are ordered over the Internet after which the article is automatically extracted from highly efficiently arranged stock, after which the article or even more articles are packaged or processed in boxes. The packages and boxes including the articles ordered need to be sent to the customer having ordered the article and for this purpose, the packages and boxes need to be fed to a loading position of a sorting device, the sorting device arranged for sorting the packages and boxes to a discharging position to lead the each package or box to a bin for further distribution to an area the customer is locating.

Such sorting devices are having a large capacity since the number of bins locating around the sorting devices may be very large in order to perform a very specific preselection of the packages and boxes to be distributed to very specific areas around the world. Since the capacity of these sorting devices is very large, a plurality of feeding conveyor means are arranged around the sorting device as well to provide for a highly efficient operating sorting device to achieve that the sorting device is processing according to the highest number of packages and boxes possible. The feeding conveyor means are provided with a scanning means to scan for example a barcode present on the each package or box so as to at least detect the barcode indicative for information to be printed on a label to be applied on the each package or box by means of a labelling means arranged between the scanning means and the loading position of the sorting device.

A drawback of such sorting devices is that the scanning means and the labelling means require a space both around each feeding conveyor means as well as in a direction of feeding to accommodate both the scanning means and the labelling means causing wide and long branched supply chain for the sorting device respectively and causing a low efficient usage of the logistic area the sorting device is arranged in.

SUMMARY OF THE INVENTION

It is an object of the present invention to alleviate the above mentioned drawback. To this end a first aspect of the invention relates to a sorting device for loading, conveying and discharging objects, the sorting device comprising:
- trays each intended for carrying an object in a conveyance direction from a loading position to a discharge position,
- a drive system for conveying the trays along a path,
- a pusher arm arranged on the tray for by means of pushing away, discharging an object present on the tray, wherein pushing away takes place substantially transverse to the conveyance direction of the tray,
- a scanning device arranged along the path at a scanning position downstream the loading position, and arranged for scanning the object during conveyance at the scanning position,
- a labelling device arranged along the path at a labelling position downstream the scanning position, and arranged to compose a label based on the object scanned by the scanning device, and to affix the label during conveyance on the object based on the scanned object present on the tray.

A second aspect of the invention relates to a method for sorting objects, the method using a sorting device according to the first aspect of the invention, wherein the method comprises the steps of:
- receiving an object at the loading position of the sorting device,
- moving the object along the conveyance direction from the loading position to the discharge position, and before the object arrives at the discharge position:
- receiving the object at the scanning position and scanning the object by means of the scanning device,
- receiving the object at the labelling position,
- composing a label based on the object scanned by the scanning device, and
- affixing the label on the object present on the tray.

DETAILED DESCRIPTION OF THE INVENTION

The first aspect of the invention concerns a sorting device according to claim 1. The sorting device according to the invention allows a continuous process of sorting, the process of which includes the subsequent steps of loading an object, scanning the object, arranging a label comprising information about the object, and affixing the label on the object, all steps being performed while the sorting device is running at operation speed. The sorting device according to the invention prevents a need of a separate scanning device and a separate labelling device locating at each conveyor systems arranged around the sorting device for feeding objects to the sorting device, thereby allowing a smaller space both around each feeding conveyor means as well as in a direction of feeding to accommodate both the scanning means and the labelling means causing narrower and shorter branched supply chain for the sorting device respectively and causing a more efficient usage of the logistic area the sorting device is arranged in, and thereby reducing the number scanning devices and labelling devices to a minimum of at least one scanning device and at least one labelling device per sorter device.

In an embodiment, the scanning device is arranged for scanning at least one out of: dimensions of the object, a position of the object with respect to the tray, an orientation of the object with respect to the tray, a barcode, a position of a barcode locating on the object, an orientation of a barcode locating on the object. By scanning the dimensions of the object on the tray, it becomes possible to gather the information about the size of the object present on the tray in case this information is not yet available in a database corresponding to the object, or to compare said information with data available in a database corresponding to the object. By scanning the position and/or the orientation of the object with respect to the tray, it becomes possible to store this information in a database corresponding to the object. By scanning the barcode, it becomes possible to link said object with further information about said object stored in a database. By scanning the position and/or the orientation of the barcode of an object, the position and/or the orientation of the barcode of the object may be stored in a database in the form of data that may be used after storing it.

In an embodiment, the labelling device is arranged to compose a label based on the barcode locating on the object scanned by the scanning device, and to affix the label on the object based on at least one out of: the dimensions of the object, the position of the object with respect to the tray, the orientation of the object with respect to the tray, the position of a barcode locating on the object, the orientation of a barcode locating on the object. In this way, a label may be composed comprising information about the object such as at least part of the information already present on the barcode, for example in the form of a further barcode, and for example, in addition, a print of an address to send the object to. In this way, the label may be affixed on to the object, taking into account the dimensions of the object, the position and/or the orientation of the object with respect to the tray, in order to define where the object is locating to attach the label on a desirable location. In some cases, the original barcode needs to be used as the location to affix the label on or just next to it. In these cases, the information about the position and/or the orientation of the barcode is taken into account as well when the position and/or orientation of the label on the object is determined.

In an embodiment, a control device is configured to receive from the scanning device data concerning the object scanned by the scanning device, and to process the data so as to transmit the processed data to the labelling device to enable the labelling device to compose a label based on the processed data, and to affix the label on the object based on the processed data when the object locating on the tray is passing the labelling position. In this way, the data collected by the scanning device can be used to control the labelling device, wherein the control device at least transmits the data, such as the dimensions of the object, the position of the object with respect to the tray, the orientation of the object with respect to the tray, the barcode, the position of a barcode locating on the object, the orientation of a barcode locating on the object, to instruct the labelling device the location of the object when affixing the label.

In an embodiment, the labelling device is associated with a printing device to print the label corresponding to the object, and wherein the labelling device comprises a robot having an operating means to pick a printed label and to affix the printed label on to the object. In this way, it becomes possible that the robot is capable to get a printed label and to reach it out to the object locating on the tray based.

In an embodiment, the robot is arranged along the path, the robot allowing the operating means to move according to at least three degrees of freedom, the robot comprising a actuator to allow a movement along its longitudinal axis to move the operating means towards the object to be labelled, the robot preferably comprising a further actuator to move the actuator along with a conveyance speed of the trays. In this way, it becomes possible to control the labelling device to, after determining the spot on the object to affix the label on, pick a printed label from the printing device and direct the operating means carrying the printed label to the spot on the object to affix the label on that spot. By moving the actuator along with the conveyance speed of the trays, it becomes possible to affix the label more accurate and, in addition, the speed of the trays may be adjusted to a higher level.

In an embodiment, the robot is arranged along the path, the robot allowing the operating means to move according to at least four degrees of freedom, the robot comprising a actuator to allow a movement along its longitudinal axis to move the operating means towards the object to be labelled and to allow a rotation around its longitudinal axis to rotate the operating means according to a predetermined orientation determined by the position and/or the orientation of the object, the robot preferably comprising a further actuator to move the actuator along with a conveyance speed of the trays. In this way, it becomes possible to affix the label with a higher accuracy even in case the object is having a craggy, jagged or rugged outer shape or at least deviating from substantially rectangular shapes like boxes. By moving the actuator along with the conveyance speed of the trays, it helps to affix the label more accurate and, in addition, the speed of the trays may be adjusted to a higher level.

In an embodiment, the scanning device is equipped with a series of cameras arranged around the path so as to capture the object and/or its barcode from several distinct positions and wherein the control device is configured to determine at least one out of: the dimensions of the object, the position of the object with respect to the tray, the orientation of the object with respect to the tray, the position of a barcode locating on the object, the orientation of a barcode locating on the object. In this way, the scanning device is capable to collect information about the object scanned, such as the dimensions of the object, the position of the object with respect to the tray, the orientation of the object with respect to the tray, the barcode, the position of a barcode locating on the object, and the orientation of a barcode locating on the object.

In an embodiment, from the series of cameras, when the object is conveyed along conveyance direction, a view of each camera is directed towards the object to be scanned, the series of cameras comprising:
  a first camera having a first view which is directed in the conveyance direction,
  a second camera having a second view which is directed in an opposite direction of the conveyance direction,
  a third camera having a third view which is directed transverse to the conveyance direction, seen from the first position of the pusher arm,
  a fourth camera having a fourth view which is directed transverse to the conveyance direction, seen from the second position of the pusher arm, and/or
  a fifth camera having a fifth view which is directed above the object locating on the tray, and
  wherein the control device is configured to capture the first, second, third, fourth and/or fifth views from the first, second, third, fourth and/or fifth camera respectively, and wherein the control device is configured to process the first, second, third, fourth and/or fifth views to determine at least one out of: the dimensions of the object, the position of the object with respect to the tray, the orientation of the object with respect to the tray, the position of a barcode locating on the object, the orientation of a barcode locating on the object. In this way, it becomes possible to determine the dimensions of the object, the position of the object with respect to the tray, the orientation of the object with respect to the tray, the barcode, the position of a barcode locating on the object, and the orientation of a barcode locating on the object, with an acceptable accuracy, and to process these to incorporate these on the label to be printed and to be applied on the object at the labelling position of the sorting device, and to process these to instruct the labelling device the location of the object to affix the label on.

In an embodiment, the scanning device is equipped with a weighing device arranged under the path so as to determine a weight of the object. In this way, it becomes possible to collect weight information about the object scanned, such as the mass and/or the density of the object, the weight information to be processed and printed on the label to be applied on the object.

In an embodiment, the tray comprises an unloading section via which unloading section the object present on the tray may be released when locating at the discharge position, a pusher arm is arranged on the tray for by means of pushing away, discharging the object present on the tray, wherein pushing away takes place substantially transverse to the conveyance direction of the tray and wherein at least during conveyance of the object present on the tray, the pusher arm is in a first position facing away from the unloading section, and wherein at least for discharging the object present on the tray, the pusher arm moves to a second position in which the pusher arm is near the unloading section of the tray, a guide rail is arranged at the loading position, the guide rail extending along the conveyance direction, above the path where the trays are to be conveyed, the guide rail extending at least between the first position and the second position of the pusher arm being present when a tray is passing the loading position, so as the guide rail to form a protection means for protecting the pusher arm from being hit by an object when the object is loaded on a tray present at the loading position. In this way, it becomes possible to receive an object arriving at the tray with a high impact and to prevent the pusher arm being damaged by an object arriving at the tray with too much impact, in particular objects having a height dimension which are higher than a height between the guide rail and the top surface of the tray.

In an embodiment, when seen in top view on the tray, a first distance between a surface of the guide rail facing the object to be loaded and the pusher arm is equal to or at least larger than a second distance between the top side of a tray and the top side of the pusher arm. In this way, the pusher arm is protected against those objects having a height dimension which are higher than a height between the guide rail and the top surface of the tray, while smaller objects may slide, when loaded on the sorting device and arriving at the tray, underneath the guide rail and stop before or by means of the pusher arm. In this way, even these smaller objects positioned this way allow to be viewed by the scanning device scanning for example the barcode on such object with an acceptable accuracy.

In an embodiment, a driving means to move the pusher arm from the first position to the second position is adapted to move the pusher arm from the first position to an intermediate position wherein the pusher arm is moved up to the surface of the guide rail facing the object to be loaded so as to allow arrival of relatively small or thin objects in the gap to be pushed away from the pusher arm locating in its first position. In this way, it becomes possible to rearrange or to reposition an object loaded on the tray in case at least a portion of the object is slit in the gap thereby allowing the labelling device to achieve the entire object to affix the label on.

In an embodiment, the labelling device is arranged to affix the label on the scanned object based on at least one out of the dimensions of the object, the position of the object with respect to the tray, the orientation of the object with respect to the tray, the position of a barcode locating on the object, the orientation of a barcode locating on the object. In this way, a label may be composed comprising information about the object, for example in the form of a barcode, and for example, in addition, a print of an address to send the object to. In this way, the label may be affixed on to the object, taking into account the dimensions of the object, the position and/or the orientation of the object with respect to the tray, in order to define where the object is locating to attach the label on a desirable location.

The second aspect of the invention concerns a method according to claim 15. The method according to the second aspect of the invention provides a continuous process of sorting, the process of which includes the subsequent steps of loading an object, scanning the object, arranging a label comprising information about the object, and affixing the label on the object, all steps being performed while the sorting device is running at operation speed. The method according to the invention prevents a need of a separate scanning device and a separate labelling device locating at each conveyor systems arranged around the sorting device for feeding objects to the sorting device, thereby allowing a smaller space both around each feeding conveyor means as well as in a direction of feeding to accommodate both the scanning means and the labelling means causing narrower and shorter branched supply chain for the sorting device respectively and causing a more efficient usage of the logistic area the sorting device is arranged in, and thereby reducing the number scanning devices and labelling devices to a minimum of at least one scanning device and at least one labelling device per sorter device.

In an embodiment, the scanning device is arranged for scanning at least one out of: dimensions of the object, a position of the object with respect to the tray, an orientation of the object with respect to the tray, a barcode, a position of a barcode locating on the object, an orientation of a barcode locating on the object, and the labelling device is arranged to compose a label based on the barcode locating on the object scanned by the scanning device, and to affix the label on the object based on at least one out of: the dimensions of the object, the position of the object with respect to the tray, the orientation of the object with respect to the tray, the position of a barcode locating on the object, the orientation of a barcode locating on the object, wherein the method comprises the steps of:

upon receiving the object at the scanning position, scanning the object by means of the scanning device, comprises scanning at least one out of: dimensions of the object, a position of the object with respect to the tray, an orientation of the object with respect to the tray, a barcode, a position of a barcode locating on the object, an orientation of a barcode locating on the object, composing a label based on the object scanned by the scanning device, comprises composing a label based on the barcode locating on the object scanned by the scanning device and affixing the label on the object present on the tray, comprises affixing the label on the object based on at least one out of: the dimensions of the object, the position of the object with respect to the tray, the orientation of the object with respect to the tray, the position of a barcode locating on the object, the orientation of a barcode locating on the object. By scanning the dimensions of the object on the tray, it becomes possible to gather the information about the size of the object present on the tray in case this information is not yet available in a database corresponding to the object, or to compare said information with data available in a database corresponding to the object. By scanning the position and/or the orientation of the object with respect to the tray, it becomes possible to store this information in a database corresponding to the object. By scanning the barcode, it becomes possible to link said object with further information about said object stored in a database. By scanning the position and/or the orientation of the barcode of an object, the position and/or the orientation of the barcode of the object may be stored in a database in the form of data that may be used after storing it. The label may be composed comprising information about the object such as at least part of the information already present on the barcode, for example in the form of a further barcode, and for example, in addition, a print of an address to send the object to. In this way, the label may be affixed on to the object, taking into account the dimensions of the object, the position and/or the orientation of the object with respect to the tray, in order to define where the object is locating to attach the label on a desirable location. In some cases, the original barcode needs to be used as the location to affix the label on or just next to it. In these cases, the information about the position and/or the orientation of the barcode is taken into account as well when the position and/or orientation of the label on the object is determined.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in a schematic way in the drawings, wherein.

It should be noted that items which have the same reference numbers in different figures, have the same structural features and the same functions, or are the same signals. Where the function and/or structure of such item has been explained, there is no necessity for repeated explanation thereof in the detailed description.

DETAILED DESCRIPTION OF THE DRAWINGS

Figure 1:
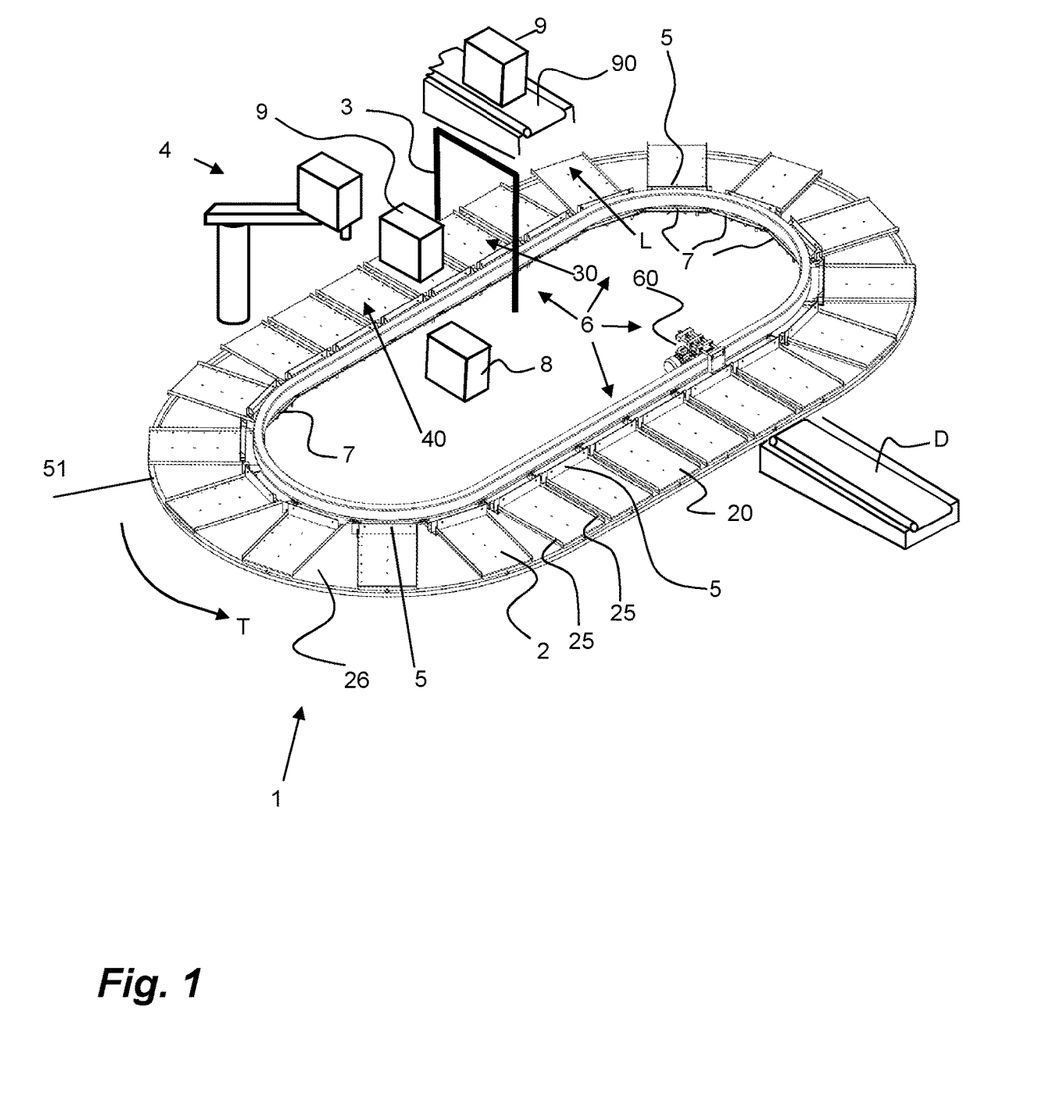
FIG. 1 is an isometric view of the sorter device according to the invention, the sorting device including a scanning device, labelling device and a control device to control the scanning device and the labelling device.

FIG. 1 shows a sorting device 1 for loading, conveying and discharging objects. The sorting device 1 is provided with trays 2, each tray 2 intended for carrying an object 9 from a loading position L to a discharge position D, in which discharge position D the object leaves the tray 2 via an unloading section 20 of the tray 2. The sorting device 1 comprises a drive system 6 for conveying the trays 2 in a conveyance direction T from the loading position L to the discharge position D, wherein for the purpose of conveying the trays 2 along a path 26, the drive system 6 comprises a series of linked driving elements 7. For transferring a drive power onto the drive system 6, a drive 60 is arranged for conveying the trays 2. When a tray 2 carrying an object 9 arrives at a discharge position D to drop off the object, the object 9 needs to be moved from the tray 2 via the unloading section 20 of the tray 2 by means of a pusher arm 5. The pusher arm 5 is arranged on the tray 2 for by means of pushing away, discharging an object 9 present on the tray 2, wherein pushing away takes place substantially transverse to the conveyance direction T of the tray 2 and wherein at least during conveyance of an object 9 present on the tray 2, the pusher arm 5 is in a first position facing away from the unloading section 20, and wherein at least for discharging an object present on the tray 2, the pusher arm 5 moves to a second position in which the pusher arm 5 is near the unloading section 20 of the tray 2.

Figure 2:
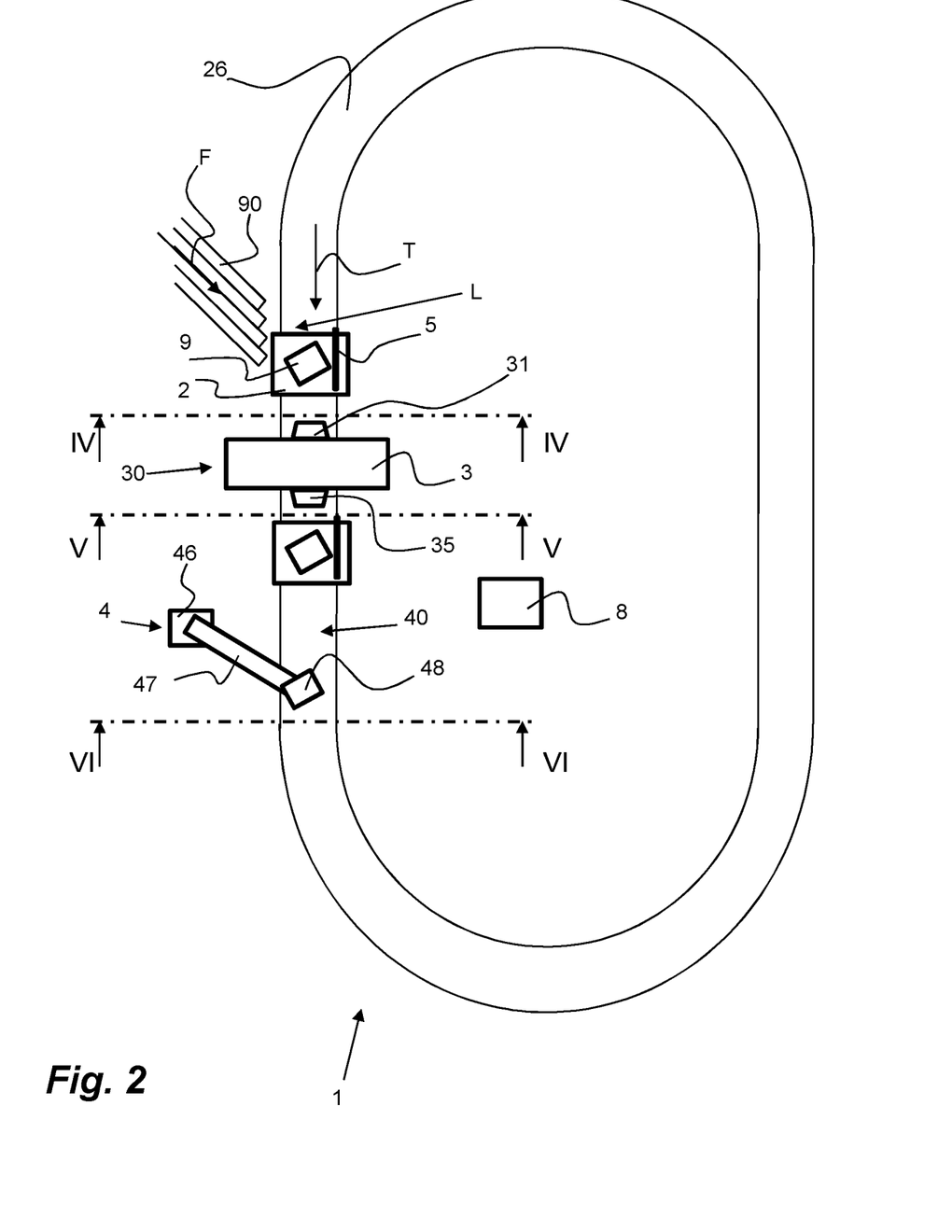
FIG. 2 is a top view of the sorter device according to FIG. 1.

FIG. 1 shows, in a schematic form, a scanning device 3 and a labelling device 4 according to the invention. The scanning device 3 is arranged along the path 26 at a scanning position 30 downstream the loading position L. The labelling device 4 is arranged along the path 26 at a labelling position 40 downstream the scanning position 30. The arrangement of the scanning position 30 and the labelling position 40 relating to each other and to the loading position L and the discharge position D is shown both in FIGS. 1 and 2. FIG. 2 shows a top view of a sorting device 1, wherein only two trays 2 are depicted to keep the drawing simple. At the loading position L, a feeder has a feeding direction F which is angled with the conveyance direction T of the trays 2 of the sorting device 1.

Figure 3:
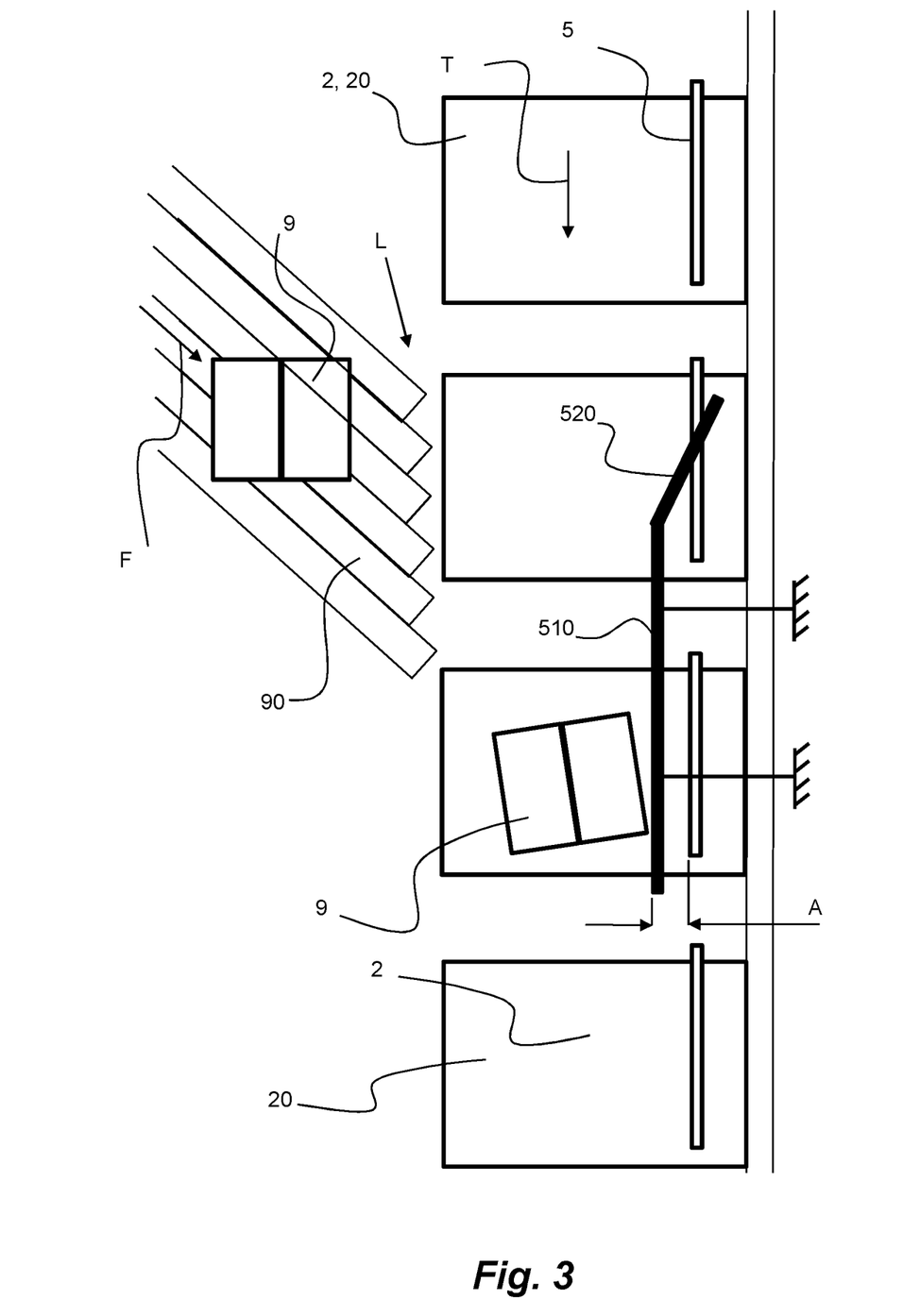
FIG. 3 is a top view of a loading position of the sorter device according to FIG. 1.

FIG. 3 shows a more detailed top view of the sorting device 1 at the loading position L. At the loading position, the feeder 90 reaches the sorting device 1 so as to drop an object 9 from the feeder 90 on to the top side of a tray 2 passing along the feeder 90. In this example, the feeding direction F indicated by arrow F and the conveyance direction T of the passing tray 2 form an angle of approximately 45 degrees. The object 9 locating on the feeder 90 will, when entering the tray 2, slightly rotate around a vertical axis of the object depending on the dynamic behavior of both the sorting device 1 and the feeder 90. Depending on the dimensions and the weight properties of the object 9, the object 9 enters the tray 2 with more or less energy to be dissipated before the object 9 comes in rest on the tray 2. In case one object arrives at the tray 2 with too much impact, it may damage the part of the sorting device 1 which receives the object. In most cases, the pusher arm 5 locating in the first position is the part being hit when the object is loaded.

In order to protect the pusher arm 5 from being damaged, a guide rail 510 is arranged at the loading position L. The guide rail 510 extends along the conveyance direction T, above the path 26 where trays 2 are conveyed. The guide rail 510 extends at least between the first position and the second position of the pusher arm 5 being present when an object is loaded on a tray 2 present at the loading position L. As a result, the guide rail 510 forms a protection means for protecting the pusher arm 5 from being hit by an object when the object is loaded on a tray 2 present at the loading position L. The guide rail 510 is mounted to a static part of the sorting device 1. When seen in top view on the tray 2, the guide rail 510 is set in such a way as to allow a first distance A. FIG.

Figure 4:
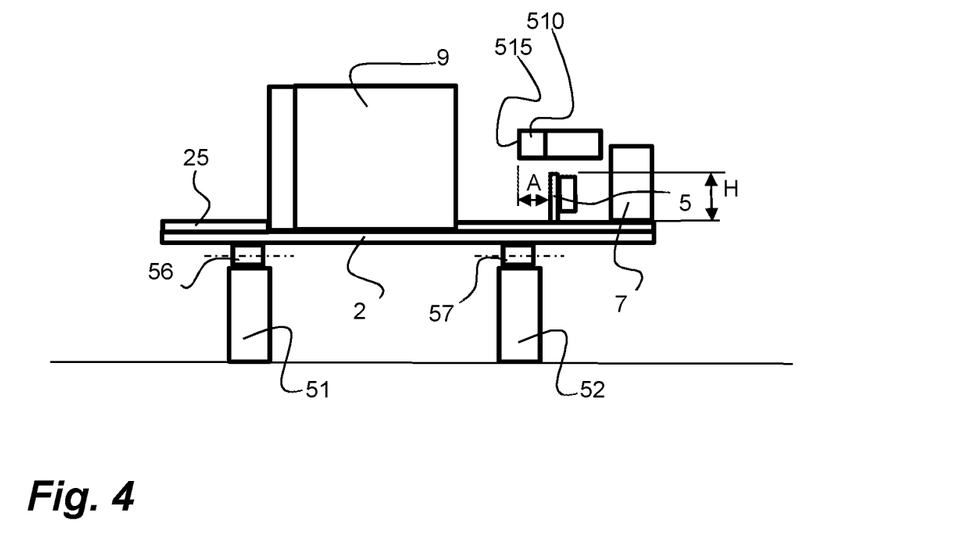
FIG. 4 is a cross sectional view of a path of the sorter device according to line IV-IV drawn in FIG. 2.

4 shows both the first distance A extending between a surface 515 of the guide rail 510 facing the object 9 to be loaded and the pusher arm 5 and a second distance H extending between the top side of a tray 2 and the top side of the pusher arm 5. The first distance A is equal to or at least larger than a second distance H. In practical cases, the second height is at least about 80 mm, preferable about 100 mm, and 150 mm at the maximum.

FIG. 4 shows a front view of a path 26 of the sorting device 1 according to line IV-IV drawn in FIG. 2. It shows an object 9 supported by the tray 2 during conveyance operation of the sorting device 1. The tray 2 comprises an upstanding or raised edge 25 to prevent an object from dropping off the tray 2 in the conveyance direction T during dynamic operation of the sorting device 1. During operation of the sorting device 1, the tray 2 is driven along the conveyance direction T, the tray 2 being guided on the path 26 and supported by rollers or wheels 56, 57 running on the path 26, the path 26 supported by supporting elements 51 and 52.

Referring to FIG. 3, the guide rail 510 comprises an inlet portion 520 to guide objects which have entered the sorting device 1 earlier than the object currently fed by the feeder 90, because it may happen that because of some dynamic events during a conveyance period, the earlier entered object has moved from its earlier position after being received on the sorting device. The inlet portion 520 forces such object again in the direction of the unloading section 20 of the tray 2 to prevent a collision with a front portion of the guide rail 510 which would cause an undesired interruption in operation of the sorting device 1.

Referring to FIG. 4, a height H between a lower part of the guide rail 510 with respect to the top side of the tray 2 is adapted to allow passing the pusher arm 5 of the tray 2 and to prevent arrival of relatively large objects 9 in a gap between the lower part of the guide rail 510 and the top side of the tray 2. In an example, a driving means (not shown) which is arranged to move the pusher arm 5 from the first position to the second position, is adapted to move the pusher arm 5 from the first position to an intermediate position wherein the pusher arm 5 is moved up to the surface 515 of the guide rail 510 facing the object to be loaded so as to allow arrival of relatively small or thin objects in the gap to be pushed away from the pusher arm 5 locating in its first position.

Figure 5:
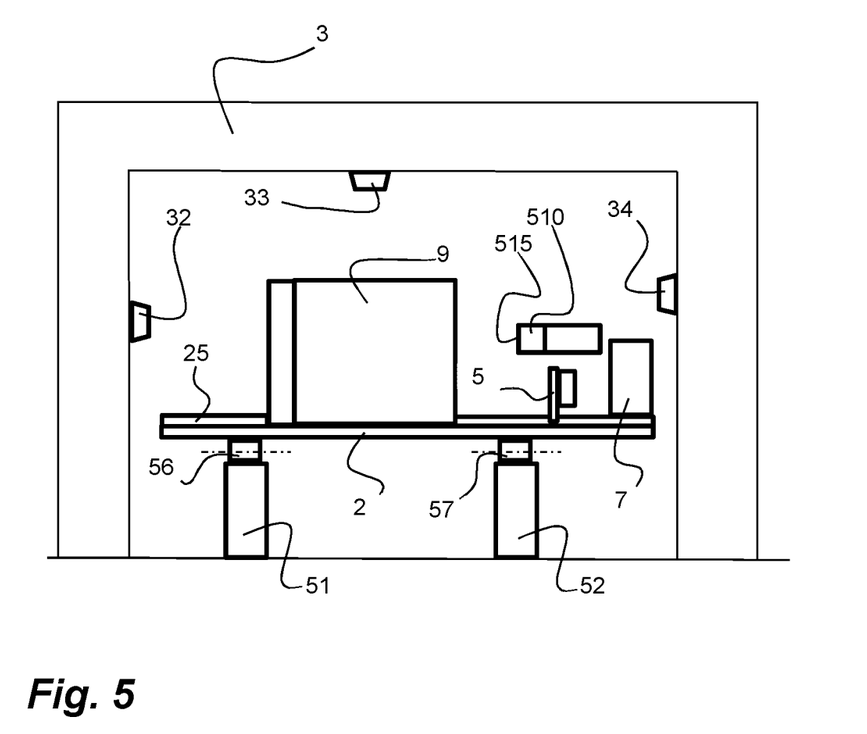
FIG. 5 is a cross sectional view of a path of the sorter device according to line V-V drawn in FIG. 2.

Referring to FIGS. 1, 2 and 5, the scanning device 3 is arranged for scanning the object 9 during conveyance at the scanning position 30. In this example, the scanning device 3 is arranged for scanning at least one out of: dimensions of the object 9, a position of the object 9 with respect to the tray 2, an orientation of the object 9 with respect to the tray 2, a barcode, a position of a barcode locating on the object 9, an orientation of a barcode locating on the object 9. For the purpose of affixing a label on each object conveyed by the sorting device 1, the position and the orientation of each object 9 locating on the tray 2 is, according to the invention, necessary to be mapped after the object 9 is loaded on the sorting device 1 and before it enters the labelling position 40. Normally, an object is provided with a barcode corresponding to the object conveyed. In such cases, a control device 8 may have access to a database comprising data which corresponds with the object conveyed. The position and the orientation of the barcode corresponding to the object 9 locating on the tray 2 is, according to the invention, also necessary to be mapped after the object 9 is loaded on the sorting device 1 and before it enters the labelling position 40.

The position and the orientation of an object 9 is information which is usable during conveying of the object 9. This information may be received, by a control device 8 which is configured to receive from the scanning device 3 data concerning the object 9 scanned by the scanning device 3. The control device 8 is configured to process the data so as to transmit the processed data to the labelling device 4 to enable the labelling device 4 to compose a label based on the processed data, and to affix the label on the object 9 based on the processed data when the object 9 locating on the tray 2 is passing the labelling position 40. The object information collected at the scanning device 3 is input for the labelling device 4 to define the exact position and optionally the orientation of the object 9 with respect to the tray 2 which is needed to affix a label on the object in that position and orientation of the object 9.

In order to collect the information in the form of data, the scanning device 3 is equipped with a series of cameras 31, 32, 33, 34, 35 as shown in FIGS. 2 and 5 and arranged around the path 26 so as to capture the object 9 from several distinct positions. From the series of cameras 31, 32, 33, 34, 35, a view of each camera is directed towards the object to be scanned. As shown in FIG. 2, the series of cameras comprises a first camera 31 having a first view which is directed in the conveyance direction T and a second camera 32 having a second view which is directed in an opposite direction of the conveyance direction T. As shown in FIG. 5, a third camera 33 is arranged having a third view which is directed transverse to the conveyance direction T, seen from the first position of the pusher arm 5. A fourth camera 34 is arranged having a fourth view which is directed transverse to the conveyance direction T, seen from the second position of the pusher arm 5. In this example, a fifth camera 35 is arranged having a fifth view which is directed above the object locating on the tray.

In order to derive the information about the dimensions, the position and the orientation of the object 9 with respect to the tray 2 and about the barcode and the position and the orientation of the barcode, the control device 8 is configured to capture the first, second, third, fourth and/or fifth views from the first, second, third, fourth and/or fifth camera 31, 32, 33, 34, 35 respectively. The control device 8 is further configured to process the first, second, third, fourth and/or fifth views to derive and determine the dimensions, the position, and the orientation of the object 9 with respect to the tray 2 and the barcode and the position and the orientation of the barcode.

Additionally, the scanning device 3 is equipped with a weighing device (not shown), the weighing device arranged under the path 26 so as to determine a weight of the object 9 and the control device 8 configured to collect data concerning the weight to include this data within the information to be printed in the label.

Figure 6:
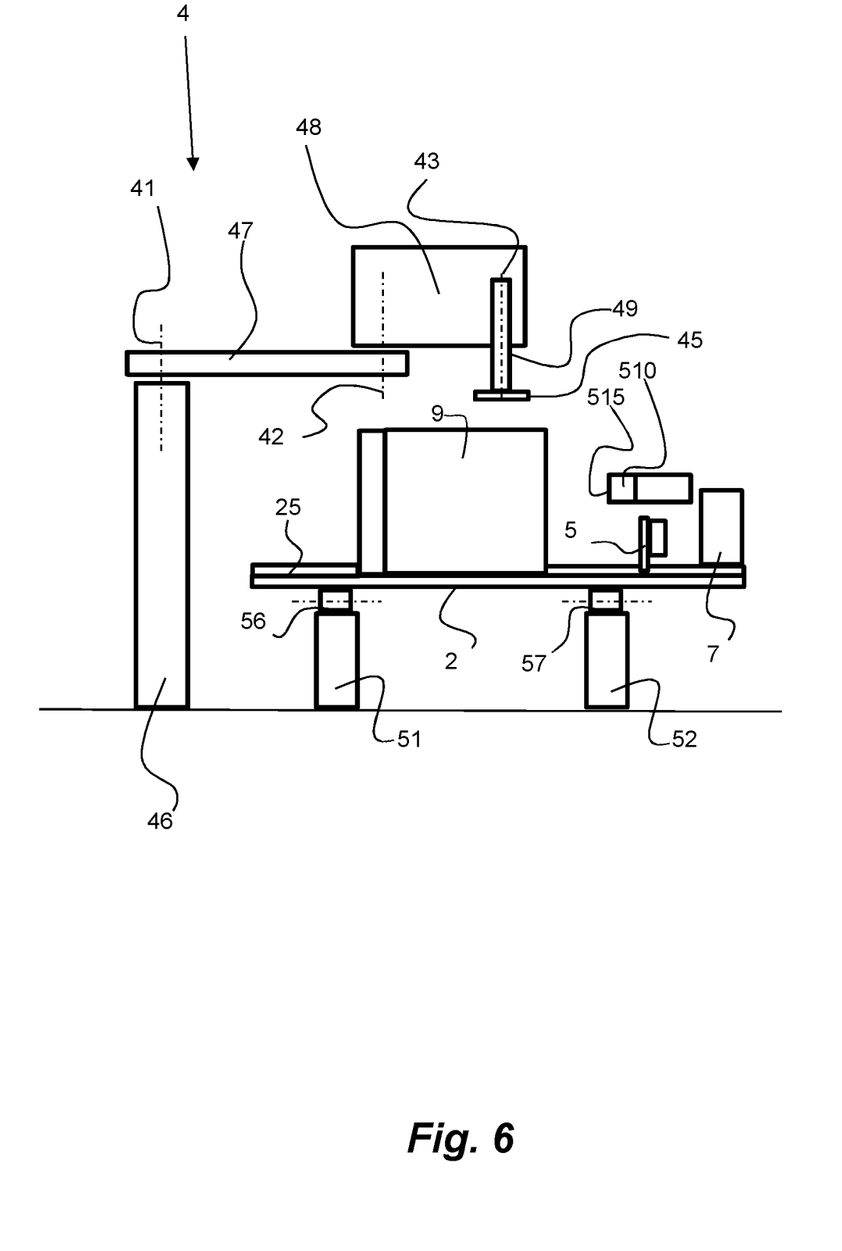
FIG. 6 is a cross sectional view of a path of the sorter device according to line VI-VI drawn in FIG. 2.

Referring to FIG. 6, the labelling device 4 is a robot 4 having an operating means 45 to pick a printed label and to affix the printed label on to the object 9 present on the tray 2. The robot 4 allows the operating means 45 to move according to at least three degrees of freedom. A first axis 41 extends near the path 26 in a direction transverse to a carrying plane of a conveying tray 2, a second axis 42 extends spacing apart and parallel to the first axis 41, and a third axis 43 extends spacing apart and parallel to the second axis 42. In this example, the robot 4 comprises a column 46 extending along the first axis 41, a first arm 47 attached to the column 46 and pivotably connected around the first axis 41, a second arm 48 attached to the first arm 47 and pivotably connected around the second axis 42 and an actuator 49 attached to the second arm 48 to allow a longitudinal movement along the third axis 43 to move the operating means 45 towards the object 9 to be labelled.

In one example, a printing device (not shown) is attached to the second arm 48 to print the label for the object 9 present on the tray 2. It is advantageous the printing device being attached to the second arm 48, since the label to be printed is very near to the locating of the object 9 to affix the label on, allowing a high speed conveyance speed of the trays. It increases, however, the inertia making the labelling device 4 slower or at least causing larger internal forces on the construction of the labelling device 4.

In an other example, the printing device is arranged near the labelling device 4 of the sorting device 1. In both configurations, the operating means 45 of the robot 4 are configured to move to the printing device and to pick a printed label from the printing device and to move the operating means 45 to the position on the object determined by the control device 8 and to affix the printed label on to the object 9.

By means of a rotation of the first arm 47 with respect to the column 46 around the first axis 41, and a rotation of the second arm 48 with respect to the first arm 47 around the second axis 42, each point between the first position of the pusher arm 5 and the unloading section 20 of the tray 2 may be reached by the operating means 45.

In order to adapt the operating means 45 of the robot 4 to the orientation of the object to be labelled, the actuator 49 is pivotably moveable around the third axis 43 to orientate the operating means including the label picked by the operating means, in accordance with the orientation of the object determined by the scanning device 1. In this case, the robot is having four degrees of freedom.

The robot 4 shown in FIG. 6 is typically known as a Selective Compliance Articulated Robot Arm, SCARA, robot. According to the invention, alternative robots may be used as well, such as delta robots having three arms connected to a universal joint at a base and having parallelograms in the arms, and gantry robots being a linear robot whose three principal axis of control are linear wherein a horizontal member is supported at both ends. All of these robots are typical pick and place robots suitable to implement in the sorting device 1 according to the invention.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugates does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A sorting device for loading, conveying and discharging objects, the sorting device comprising:
    trays each intended for carrying an object in a conveyance direction from a loading position to a discharge position,
    a drive system for conveying the trays along a path,
    a pusher arm arranged on the tray for by means of pushing away, discharging an object present on the tray, wherein pushing away takes place substantially transverse to the conveyance direction of the tray,
    a scanning device arranged along the path at a scanning position downstream the loading position, and arranged for scanning the object during conveyance at the scanning position, and
    a labelling device arranged along the path at a labelling position downstream the scanning position, and arranged to compose a label based on the object scanned by the scanning device, and to affix the label during conveyance on the object based on the scanned object present on the tray,
    wherein
        the tray comprises an unloading section via which unloading section the object present on the tray may be released when located at the discharge position,
        a pusher arm is arranged on the tray for by means of pushing away, discharging the object present on the tray, wherein pushing away takes place substantially transverse to the conveyance direction of the tray and wherein at least during conveyance of the object present on the tray, the pusher arm is in a first position facing away from the unloading section, and wherein at least for discharging the object present on the tray, the pusher arm moves to a second position in which the pusher arm is near the unloading section of the tray, and
        a guide rail is arranged at the loading position, the guide rail extending along the conveyance direction, above the path where the trays are to be conveyed, the guide rail extending at least between the first position and the second position of the pusher arm being present when a tray is passing the loading position, so as the guide rail to form a protection means for protecting the pusher arm from being hit by an object when the object is loaded on a tray present at the loading position.

2. The sorting device according to claim 1, wherein the scanning device is arranged for scanning at least one out of: dimensions of the object, a position of the object with respect to the tray, an orientation of the object with respect to the tray, a barcode, a position of a barcode located on the object, and an orientation of a barcode located on the object.

3. The sorting device according to claim 2, wherein the labelling device is arranged to compose a label based on the barcode located on the object scanned by the scanning device, and to affix the label on the object based on at least one out of: the dimensions of the object, the position of the object with respect to the tray, the orientation of the object with respect to the tray, the position of a barcode located on the object, and the orientation of a barcode located on the object.

4. The sorting device according to claim 1, wherein the labelling device is associated with a printing device to print the label corresponding to the object, and wherein the labelling device comprises a robot having an operating means to pick a printed label and to affix the printed label on to the object.

5. The sorting device according to claim 4, wherein the robot is arranged along the path, the robot allowing the operating means to move according to at least three degrees of freedom, the robot comprising an actuator to allow a movement along its longitudinal axis to move the operating means towards the object to be labelled.

6. The sorting device according to claim 5, wherein the robot comprises a further actuator to move the actuator along with a conveyance speed of the trays.

7. The sorting device according to claim 4, wherein the robot is arranged along the path, the robot allowing the operating means to move according to at least four degrees of freedom, the robot comprising an actuator to allow a movement along its longitudinal axis to move the operating means towards the object to be labelled and to allow a rotation around its longitudinal axis to rotate the operating means according to a predetermined orientation determined by the position and/or the orientation of the object.

8. The sorting device according to claim 7, wherein the robot comprises a further actuator to move the actuator along with a conveyance speed of the trays.

9. The sorting device according to claim 1, wherein the scanning device is equipped with a series of cameras arranged around the path so as to capture the object and/or its barcode from several distinct positions and wherein a control device is configured to determine at least one out of: the dimensions of the object, the position of the object with respect to the tray, the orientation of the object with respect to the tray, the position of a barcode located on the object, and the orientation of a barcode located on the object.

10. The sorting device according to claim 1, wherein the control device is configured to receive from the scanning device data concerning the object scanned by the scanning device, and to process the data so as to transmit the processed data to the labelling device to enable the labelling device to compose a label based on the processed data, and to affix the label on the object based on the processed data when the object located on the tray is passing the labelling positon.

11. The sorting device according to claim 9, wherein from the series of cameras, when the object is conveyed along conveyance direction, a view of each camera is directed towards the object to be scanned, the series of cameras comprising:
   a first camera having a first view which is directed in the conveyance direction,
   a second camera having a second view which is directed in an opposite direction of the conveyance direction,
   a third camera having a third view which is directed transverse to the conveyance direction, seen from the first position of the pusher arm,
   a fourth camera having a fourth view which is directed transverse to the conveyance direction, seen from the second position of the pusher arm, and/or
   a fifth camera having a fifth view which is directed above the object located on the tray, and
wherein the control device is configured to capture the first, second, third, fourth and/or fifth views from the first, second, third, fourth and/or fifth camera respectively, and wherein the control device is configured to process the first, second, third, fourth and/or fifth views to determine at least one out of: the dimensions of the object, the position of the object with respect to the tray, the orientation of the object with respect to the tray, the position of a barcode located on the object, and the orientation of a barcode located on the object.

12. The sorting device according to claim 1, wherein the scanning device is equipped with a weighing device arranged under path so as to determine a weight of the object.

13. The sorting device according to claim 1, wherein, when seen in top view on the tray, a first distance between a surface of the guide rail facing the object to be loaded and the pusher arm is at least equal to or larger than a second distance between the top side of a tray and the top side of the pusher arm.

14. The sorting device according to claim 13, wherein a driving means to move the pusher arm from the first position to the second position is adapted to move the pusher arm from the first position to an intermediate position wherein the pusher arm is moved up to the surface of the guide rail facing the object to be loaded so as to allow arrival of relatively small or thin objects in the gap to be pushed away from the pusher arm located in its first position.

15. The sorting device according to claim 1, wherein the labelling device is arranged to affix the label on the scanned object based on at least one out of the dimensions of the object, the position of the object with respect to the tray, the orientation of the object with respect to the tray, the position of a barcode located on the object, and the orientation of a barcode located on the object.

* * * * *